United States Patent [19]
Hannon et al.

[11] Patent Number: 5,211,487
[45] Date of Patent: May 18, 1993

[54] LOCKING ASSEMBLY FOR BEARING

[75] Inventors: Thomas L. Hannon; J. Thomas Mahon, both of Pittsburgh, Pa.

[73] Assignee: SMS Engineering, Inc., Pittsburgh, Pa.

[21] Appl. No.: 881,472

[22] Filed: May 11, 1992

[51] Int. Cl.$^5$ .............................................. F16C 23/00
[52] U.S. Cl. ................................... 384/562; 384/583; 384/584; 384/540
[58] Field of Search ............... 384/562, 583, 584, 519, 384/538, 540, 542

[56] References Cited

U.S. PATENT DOCUMENTS

| | | | |
|---|---|---|---|
| 3,770,994 | 11/1973 | Smith | 384/583 |
| 3,782,796 | 1/1974 | Rickley et al. | 384/584 |
| 4,626,114 | 12/1986 | Phillips | 384/584 |
| 5,154,518 | 10/1992 | Goforth | 384/584 |

*Primary Examiner*—Lenard A. Footland
*Attorney, Agent, or Firm*—Clifford A. Poff

[57] ABSTRACT

A locking assembly for a bearing, such as a bearing for a rolling mill roll, the roll having a journal for the bearing, the bearing including a cylindrical sleeve member at its outermost end mounted on an axially outer portion of the journal, the end of the sleeve formed to have a radially inward shoulder, and a radially outwardly cylindrical projection, the shoulder having a wedge-shaped cam surface formed at its outer most axial surface, an axially movable outer nut constructed to pass over the journal and having a radially inwardly annular shoulder, the shoulder of the nut having a wedge-shaped cam surface arranged to cooperate with the cam surface of the sleeve shoulder to force the sleeve in an axially inward direction on its rotation when secured to the roll, the nut including several radially outward holes spaced angularly of the axis of the bearing for allowing the nut to be rotated, cooperative openings in the nut and the projection of the sleeve for receiving bolts for securing the nut to the sleeve once the two cam surfaces have been brought into a desired locking position, the nut having an axially outwardly annular shoulder, and the roll having a retainer member for engagement with the shoulder of the nut for securing the locking assembly in a fixed position relative to the roll and bearing.

10 Claims, 2 Drawing Sheets

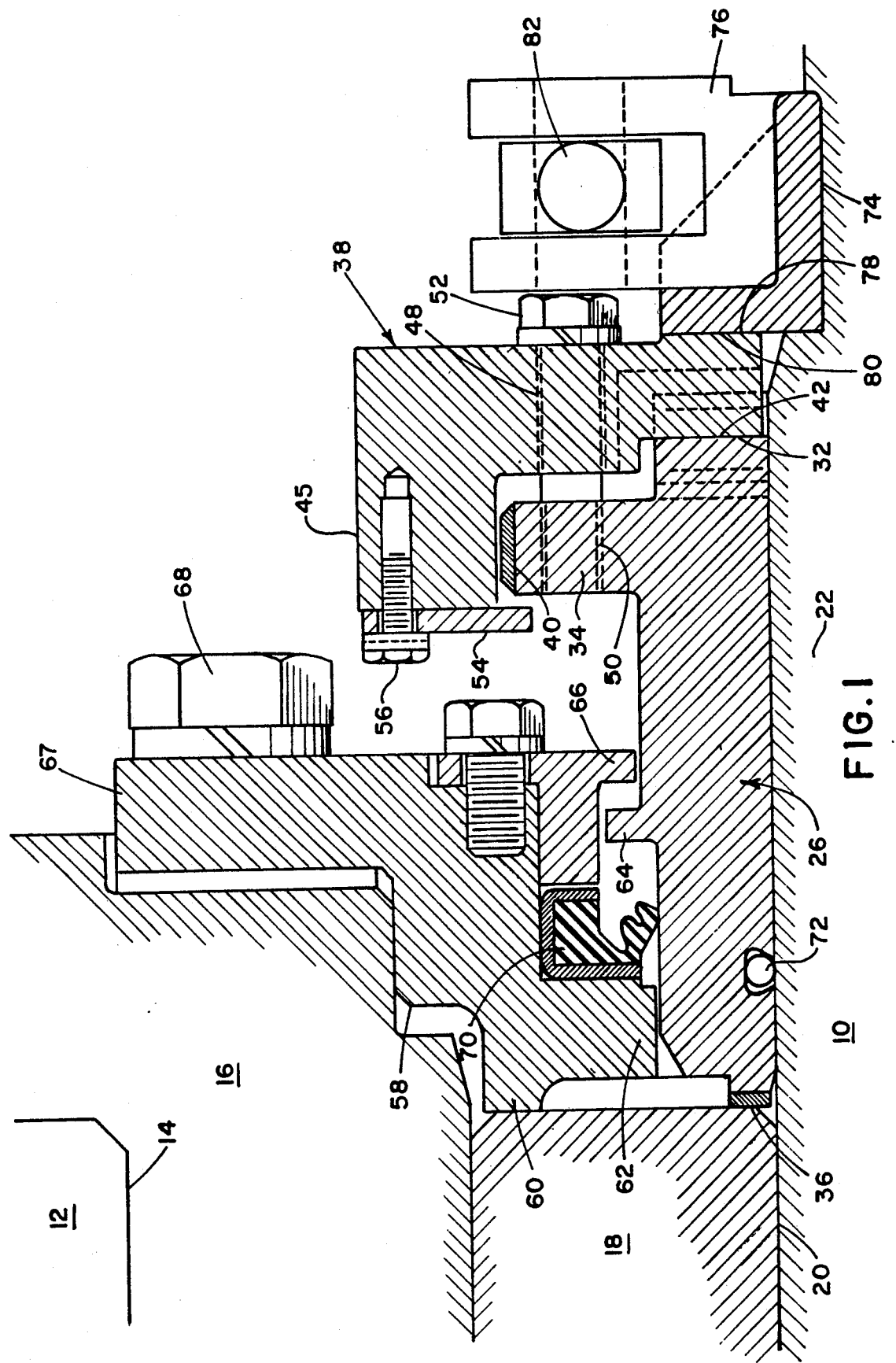
FIG. I

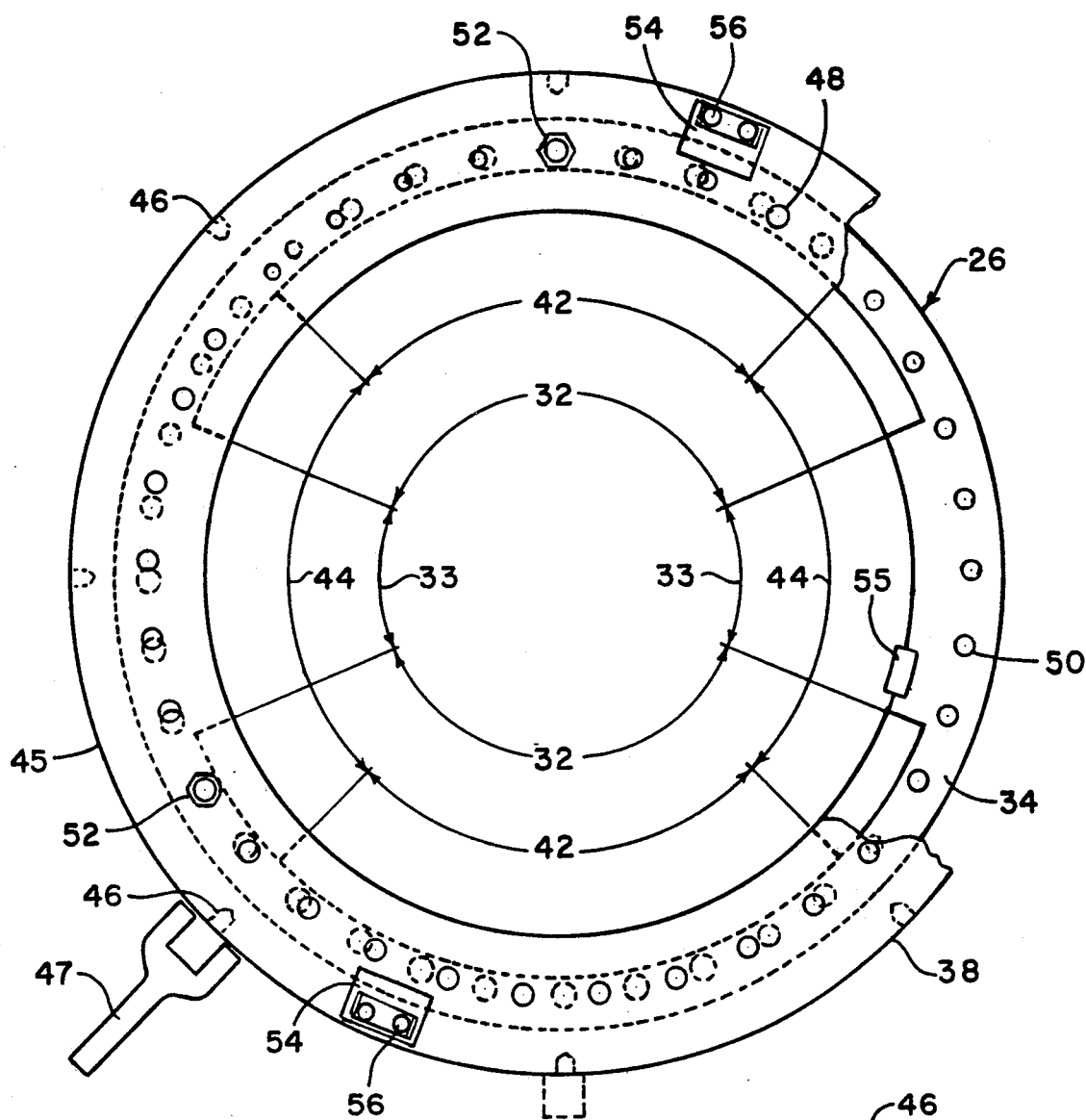
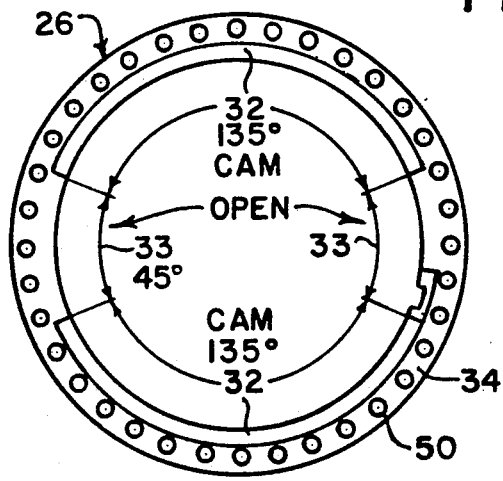
FIG.3
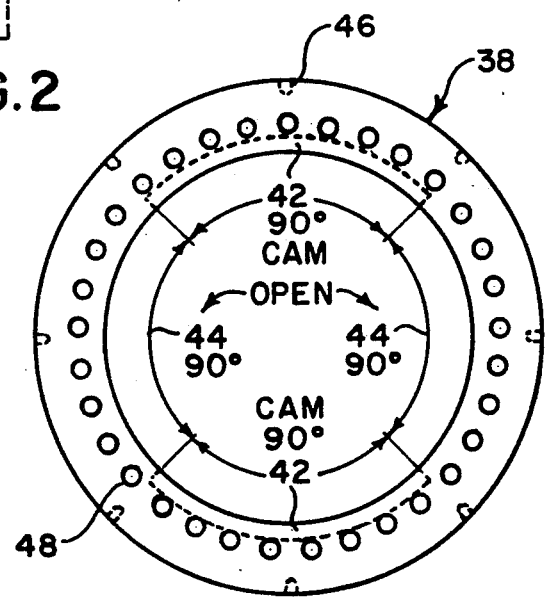
FIG.4
FIG.2

LOCKING ASSEMBLY FOR BEARING

BACKGROUND OF THE INVENTION

The present invention relates to a novel and improved locking assembly for positioning and holding a bearing on a journal of a shaft, such as a rolling mill roll, which assembly will be very simple in construction and not require separation of its parts or independent removal from the shaft when the bearing is to be removed from the shaft.

Locking assemblies for bearings have been used in the past, particularly in connection with rolls for rolling mills, and more particularly for the work rolls of the mills. Such work rolls require repeated removal from the mills for machine redressing of the worn rolling surfaces of the rolls, wherein some mills have a compliment of a very large number of such rolls. Prior to this redressing procedure, the locking assembly and bearing, with its associated chock, must be disassembled and upon completion of the procedure reassembled. In the past the locking assemblies, consisting of a number of separately assembled pieces, locking assemblies being used at the opposite ends of each roll, had to be disassembled in piece like fashion from the roll. In so doing, a workman was required to handle one or more very heavy cumbersome parts of the locking assembly, which operation had to be repeated during reassembling of the bearing.

The elements in the past that have made up the locking assemblies have been very heavy and cumbersome elements and hence very difficult for workman to lift and/or manipulate and moveover difficult in a safe manner to connect to a lifting mechanism, such as a crane. In addition, the past locking assemblies required the use of a two piece locking ring and auxiliary devices, such as locking or locating pins and locating tools which were required to assemble the two piece locking ring.

A more detail description of one form of past bearing locking assemblies appears in U.S. Pat. Nos. 3,912,345 and 3,966,282, which relates to rolling mill rolls. The locking assembly disclosed in these two patents consists of two cam rings, identified as inner and outer rings, the inner ring engaging a sleeve of the bearing and the outer ring a collar of the roll. In one disclosed form, one ring is a solid—one piece construction, while the other cooperating ring is made of a two piece construction. The outer ring is provided with pairs of locating holes for receiving locking or locating pins. Also provided is a locating tool to hold the two parts of the inner ring in place during installation until the outer ring is positioned and after the locating pins have been inserted.

SUMMARY OF THE INVENTION

It is the object of the present invention to provide an improved bearing locking assembly of the type generally referred to above, in which instead of multiple rings, only one ring is employed in the form of a nut, which is designed to be removable with the bearing as a unit so that there is no need to separately disassemble and/or independently remove the ring, and wherein there is no need for providing a locating system as previously employed, thereby greatly simplifying the assembly and disassembly of the locking assembly and greatly decreasing the time required for such operations and danger to workman involved in such operations.

Another object of the present invention is to provide a locking assembly for securing a bearing on a journal of a shaft, a cylindrical sleeve member located at the one end of the bearing and in engagement therewith and mounted on an axial portion of the journal, the end of the sleeve opposite the engaging end having a first engagable surface, the first surface having a cam surface, rotatable cylindrical nut mounted concentric with the journal adjacent the opposite end of the sleeve and having a second engagable surface, the second surface having a cam surface arranged to engage and cooperate with the cam surface of the first surface to force the sleeve in an axially inward direction on rotation of the nut when confined by the shaft, the nut including means for allowing the nut to be rotated, means for securing the nut to the sleeve once the two cam surfaces have been brought into a desired locking position, and a third engagable surface formed on the nut, means for engagement with the third surface for securing the locking assembly in a fixed position relative to the shaft and bearing.

A still further object is to provide a locking assembly for use with a bearing-chock assembly of rolling mill rolls and the like, wherein a single one piece nut is provided having an axial inner cam surface, the sleeve also has an axial outer cam surface, the two cam surfaces being designed to cooperate together so that on rotation of the nut the sleeve is forced axially inward of the roll into a locked position, the nut and sleeve having holes that are adapted to assume an aligned relationship with each other for receiving fasteners, a stop plate is mounted on the nut for limiting axial movement of the nut relative to the sleeve, a retaining means, the sleeve and the retaining means having radially projecting lugs for limiting axially movement of the sleeve, the journal of the roll has a reduced collar portion adjacent to and axially outward of the nut for receiving a split ring having a surface for contacting the nut to secure the locking assembly and bearing chock assembly on the journal, the construction being such that upon removal of the split ring and loosening of the fasteners, the locking assembly is removable from and replaceable upon the roll without disassembling from the bearing chock assembly and is removed and replaced as an integral part of the bearing-chock assembly.

BRIEF DESCRIPTION OF THE DRAWINGS

FIG. 1 is partial sectional view of a work roll bearing-chock assembly of a rolling mill illustrating a bearing locking assembly constructed in accordance to the present invention, FIG. 2 is a partial front elevational view of the elements illustrated in FIG. 1, FIG. 3 is a front elevational view of the cam surfaces of the sleeve shown in FIG. 2, and FIG. 4 is a front elevational view of the cam surfaces of the nut shown in FIG. 2.

DESCRIPTION OF THE PREFERRED EMBODIMENT

With reference to FIGS. 1 and 2 there is shown a portion of a work roll 10 for a rolling mill, only a portion of the adjacent housing of which is shown at 12. While similar locking assemblies will be provided for the bearings at the two opposite ends of the roll 10, only one of the assemblies will be described. The housing in the usual fashion has a window 14 for receiving a chock 16 into which is mounted a roller bearing 18. The bearing is fitted around the journal 20 of the neck portion 22 of the roll 10. The bearing 18 at its axially inner most end abuts against a collar, not shown, formed on the roll which fixes the bearing on the journal at its inner end. At the opposite end of the bearing a cylindrical sleeve 26 is mounted on the adjacent part of journal 20. All of the aforesaid elements and relationships are well known in the art for which reason a more detail description will not be given.

The bearing locking assembly of the present invention includes certain changes to the sleeve 26, which can be best seen in FIG. 1. At the outer axial end of the sleeve a radially inward portion is provided with a diagonally opposite pair of external identical cam surfaces 32. The pair of cam surfaces are equally spaced and are separated from each other by equal spacings or openings 33, as best shown in FIGS. 2 and 3. At the same end of the sleeve 26, the sleeve is provided with a cylindrical projection 34, best shown in FIG. 1. The sleeve also is provided with a cylindrical bearing contact surface 36 for retaining the bearing axially under a desired pressure condition.

Adjacent the sleeve 26 and axially outward therefrom is arranged a cylindrical locking nut 38, supported by the sleeve surface 40. As shown in FIGS. 2 and 4, the nut has at its inner radial portion a diagonally opposite pair of identical cam surfaces 42 formed on its axially inner side so that the cam surfaces 42 on rotation of the nut are caused to engage the cam surfaces 32 of the sleeve 26. The two separate series of cooperative cam surfaces are disposed relative to each other in an overlapping manner so that on rotation of the nut when confined by a split ring 76, the nut will force the sleeve 26 in an axially inward direction or back of the nut 38 in the opposite direction. In looking at FIG. 2, to tighten the nut, the nut will be rotated in a clock wise direction. As seen from FIGS. 3 and 4, the cam surfaces 42 of the nut 38 are shorter in length which are 90° than the cam surfaces 32 of the sleeve 26 which are 135°. It will be noted that the length of these surfaces are not related to assembly or removal. The spaces between the cam surfaces are required for machining. The cam surfaces on the sleeve are longer than those on the nut to provide full contact of the cam surfaces through the adjustment range. Each set of cam surfaces 32 and 42 takes the form of two similar cams wherein the pair of cooperative cams have the same wedge dispositions so that they will contact each other from their low points and succeedingly to their higher points when the nut is rotated to the locking position. The longer lengths of the cam surfaces of the sleeve 26 give the advantage of greater axial nut movement and therefore increase range for effecting a desired tightening of the bearing 18, while always providing full contact of the nut cam surfaces on the sleeve cam surfaces, as best shown in FIGS. 1 and 2.

The nut 38 radially outward of its cam surfaces 42 has a cylindrical portion 45 which has a series of equally spaced holes 46 which allow a spanner wrench 47 to be inserted and by which means the nut can be rotated in opposite directions, as one views FIG. 2. The nut 38 also is provided with a series of equally spaced holes 48 which on rotation of the nut to a certain axial position align with a series of equally spaced threaded holes 50 provided in the sleeve 26 and into which three equally spaced bolts 52 are inserted, by which means the sleeve and nut are held against relative rotation. In the arrangement shown, the sleeve 26 is provided with thirty-six holes 50 and the nut with thirty-three holes 48, the holes being on the same bolt circle. In any indexed position of the nut 38, three holes of the nut on its rotation will line up with three holes of the sleeve. As best shown in FIG. 1, the reverse C-shaped nut 38 at the inside of the cylindrical portion 45 is provided with two diametrically opposite stop plates 54, only one being shown in FIG. 1 and two in FIG. 2, which are secured to the back of the nut by a pair of bolts 56. The outer ends of the stop plates 54 extend radially inwardly to overhang the adjacent portion 34 of the sleeve 26, thereby to prevent the nut 38 from falling away from the sleeve during the removal of the locking assembly and bearing-chock from the roll 10. The sleeve, according to usual practice, is connected to the roll by a key, shown only in FIG. 2 at 55. The key causes the locking assembly to rotate with the roll and prevents rotation of the sleeve 26 when the nut 38 is rotated. The key is bolted to the sleeve and stays as a part of the locking assembly when the assembly is removed from the roll.

FIG. 1 shows that the bearing 18 is held in the chock 16 by a retainer ring 58 having a portion 60 that engaging the outer end of the bearing, a portion 62 for supporting the sleeve 26 when removed from the roll, a lug 64 for engaging a similar lug 66 of the sleeve and a portion 67 that extends radially outwardly adjacent the chock where the ring is secured to the chock by a series of bolts, one of which is shown at 68. The lugs 64 and 66 contain the sleeve relative to the retainer ring 58 in the axial direction, when the chock is removed from the roll. The retainer ring 58 also supports a lubrication seal 70. The sleeve 26 also is provided with a similar functioning seal at 72.

Axially outward of the nut 38, the roll 10 is provided with a cylindrical recessed portion 74 into which is received a two piece hinged or split ring 76 having a radial surface 78 that engages an adjacent radial surface 80 of the nut. Thus, the split ring 76 is the means that holds the bearing 18 in its operating position on the roll 10 once the locking assembly has positioned the sleeve 26 and bearing on the journal 20. The split ring 76 is held in its closed position on the roll by a bolt 82, shown in FIG. 1.

In removing the bearing 18 and chock 16 from the roll 10 after the roll has been removed from the mill, all that has to be done is to remove the split ring 76, remove the bolts 52, so that the cam surfaces 32 and 42 can be disengaged from each other, after which the locking assembly is free to be removed as a unit with the retainer ring sleeve 58, bearing 18 and chock 16, which also are removed as a unit from the roll 10. The stop plates 54 will prevent the nut 38 from inadvertently falling away from the sleeve 26, and thus maintain the unitary relationship of the locking assembly with the sleeve and bearing and chock. On reassembling, the operation is simply reversed, in which the elements are again treated as units requiring no individual handling or separation of the parts of the locking assembly. In this case, the chock assembly including the locking nut, bearing, retainer ring and sleeve are pushed onto the roll neck portion 22. Once the bearing 18 reaches a fixed stop on the journal 20 and the split ring 76 is assembled, the nut will be rotated to cause a specific amount of clearance to be created between the bearing and sleeve and the nut and split ring as required for proper bearing operation. The holes 48 and 50 are then aligned in the clearance position and three bolts 52 installed to prevent further rotation of the nut.

While the present invention has been described in accordance with the preferred embodiment of the figures, it is to be understood that other similar embodiments may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

We claim:

1. A locking assembly for securing a bearing on a journal of a shaft, said assembly comprising a cylindrical sleeve member located at the one end of the bearing and in engagement therewith and mounted on an axial portion of the journal, the end of the sleeve opposite said engaging end having a first engagable surface, said first surface having a cam surface, a rotatable cylindrical nut mounted concentric with the journal adjacent said opposite end of said sleeve and having a second engagable surface, said second surface having a cam surface arranged to engage and cooperate with the cam surface of said first surface to force said sleeve in an axially inward direction on rotation of said nut when secured to the shaft, said nut including means for allowing said nut to be rotated, means for securing said nut to said sleeve once the two cam surfaces have been brought into a desired locking position, and a third engagable surface formed on said nut, means for engagement with the third surface for securing the locking assembly in a fixed position relative to the shaft and bearing.

2. A locking assembly for securing a bearing on a journal of a shaft, said assembly comprising, a cylindrical sleeve member located at the outermost axial end of the bearing and in engagement therewith and mounted on an axially outer portion of the journal relative to said bearing, the outer axial end of the sleeve having a first shoulder, including an annular first engagable surface, said sleeve having a radially outwardly cylindrical projection at said axial end, said first surface having a portion with a number of spaced apart wedge-shaped cam surfaces, at the outer most axial portion of said first shoulder, an axially movable cylindrical nut mounted concentric with the journal and having a second shoulder, including a second annular engagable surface, said second surface having a portion with a number of spaced apart wedge-shaped cam surfaces arranged to engaged and cooperate with the cam surfaces of said first shoulder to force said sleeve in an axially inward direction on rotation of said nut when confined to the roll, said nut including means for allowing said nut to be rotated, cooperative openings in said nut and said projection of said sleeve for receiving bolts for securing said nut to said sleeve once the cam surfaces of said sleeve and nut have been brought into a desired locking position, and a third engagable surface formed on said nut, means for engagement with the third surface for securing the locking assembly in a fixed position relative to the roll and bearing.

3. A locking assembly according to claim 2, wherein said cam surfaces of said first and second shoulders are equal in number and the cam surfaces of each shoulder are separated by spaces between adjacent end portions of said cam surfaces of their respective shoulders.

4. A locking assembly according to claim 2, wherein said nut includes a stop means having a portion for engaging said sleeve in a manner to limit relative axial movement between said nut and said sleeve.

5. A locking assembly according to claim 4, wherein said nut takes the form of a C-shaped member, and means for securing said stop means to the axially inward most part of said member.

6. A locking assembly according to claim 2, wherein said means allowing rotation of said nut comprises a number of circumferentially spaced holes constructed to be engaged by a tool means.

7. A locking assembly according to claim 2, wherein said cams of said first and second shoulders take the form of circumferential wedges, each wedges of said first and second shoulders having the same wedge disposition relative to the axis of the roll.

8. A locking assembly according to claim 2, including retaining means for said sleeve, said retaining means arranged radially outward of said sleeve having a portion for supporting said sleeve, and means for securing said retaining means in a manner to prevent relative movement between said retaining means and the bearing.

9. A locking assembly according to claim 8, wherein said retaining means and said sleeve have radially projecting axially spaced apart lugs constructed to cooperate together to limited relative axial movement between said retaining means and sleeve.

10. A locking assembly according to claim 2, wherein said wedge-shaped cam surfaces of said sleeve are substantially circumferentially longer than said wedge-shaped cam surfaces of said nut.

* * * * *